(12) United States Patent
Satake

(10) Patent No.: US 7,394,575 B2
(45) Date of Patent: Jul. 1, 2008

(54) ELECTRONIC DEVICE

(75) Inventor: Eiji Satake, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 1032 days.

(21) Appl. No.: 10/715,735

(22) Filed: Nov. 18, 2003

(65) Prior Publication Data

US 2004/0160647 A1  Aug. 19, 2004

(30) Foreign Application Priority Data

Nov. 19, 2002  (JP) .............................. 2002-335195

(51) Int. Cl.
*H04N 1/36*  (2006.01)
*H04N 1/04*  (2006.01)

(52) U.S. Cl. .................. 358/412; 358/486; 358/497

(58) Field of Classification Search .................. 358/505, 358/406, 412, 410, 471, 474, 486, 497
See application file for complete search history.

(56) References Cited

U.S. PATENT DOCUMENTS

| | | | |
|---|---|---|---|
| 4,910,599 A | 3/1990 | Hashimoto | |
| 5,191,426 A | 3/1993 | Kochi | |
| 5,539,532 A | 7/1996 | Watanabe | |
| 5,684,609 A | 11/1997 | Potucek et al. | |
| 5,940,636 A * | 8/1999 | Konishi et al. | 396/207 |
| 6,100,928 A | 8/2000 | Hata | |
| 6,106,090 A * | 8/2000 | Uchida et al. | 347/8 |
| 6,130,996 A * | 10/2000 | Konishi et al. | 396/395 |
| 6,528,962 B1 | 3/2003 | Igarashi et al. | |
| 6,575,546 B2 * | 6/2003 | Matsumoto et al. | 347/14 |
| 6,748,124 B1 | 6/2004 | Nishiyama | |
| 6,890,057 B2 * | 5/2005 | Gotoh et al. | 347/36 |
| 7,051,431 B2 * | 5/2006 | Ueda et al. | 29/832 |
| 2002/0001006 A1 * | 1/2002 | Matsumoto et al. | 347/16 |
| 2004/0109714 A1 * | 6/2004 | Metzler | 399/394 |

FOREIGN PATENT DOCUMENTS

| | | |
|---|---|---|
| CN | 1282015 | 1/2001 |
| CN | 1320248 | 10/2001 |
| JP | 61111063 | 5/1986 |
| JP | 61227692 | 10/1986 |
| JP | 01258557 | 10/1989 |
| JP | 02-308234 | 12/1990 |
| JP | 3177156 | 8/1991 |
| JP | 4-92557 | 3/1992 |
| JP | 04270551 | 9/1992 |
| JP | 04306057 | 10/1992 |

(Continued)

*Primary Examiner*—Jerome Grant, II

(57) ABSTRACT

An electronic device includes a carriage on which an image sensor is mounted, a motor that drives the carriage, and servo-control-containing printed matter provided in one or more detection areas of the image sensor or one or more independently provided optical sensors. The servo control information is used for speed control and initial position detection of the carriage. A servo controller performs the servo control on the motor via a motor driver based on the read servo control information. The printed matter is provided on a rear or underside surface of a support structure in areas irradiated by a light source for the image sensor. Printed matter for speed control may be provided in one area and printed matter for initial position detection in another. Servo control information on the printed matter may be read using a dummy pixel region of the image sensor.

14 Claims, 14 Drawing Sheets

FOREIGN PATENT DOCUMENTS

| | | |
|---|---|---|
| JP | 10107962 | 4/1998 |
| JP | 11-164101 | 6/1999 |
| JP | 2000-050031 | 2/2000 |
| JP | 2001-103778 | 4/2001 |
| JP | 2001-158143 | 6/2001 |
| JP | 2002199160 | 7/2002 |

* cited by examiner

Fig. 6 (A)
Fig. 6 (B)
Fig. 6 (C)
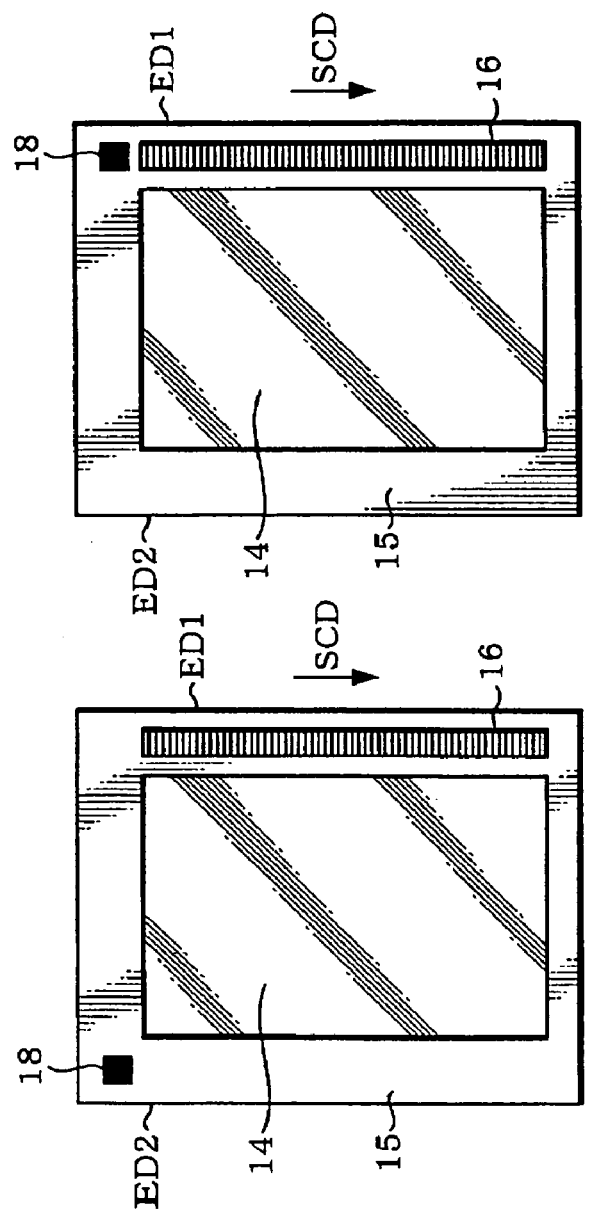
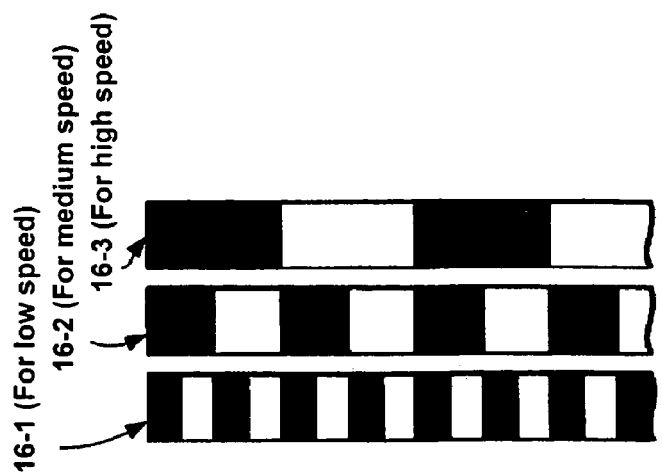

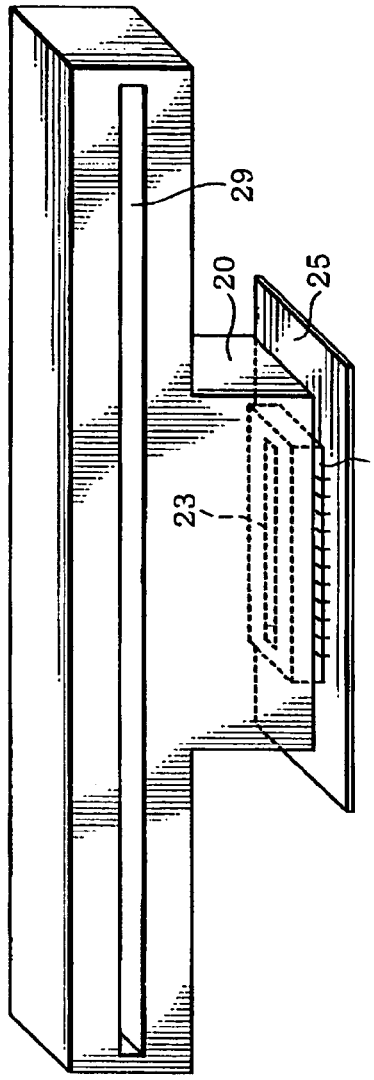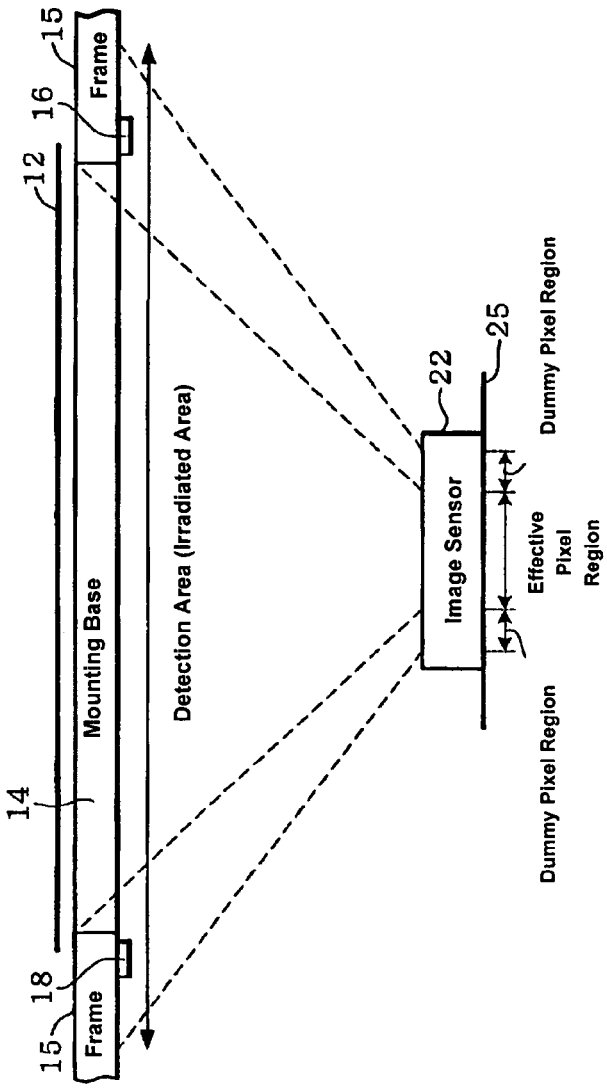
Fig. 8 (A)
Fig. 8 (B)

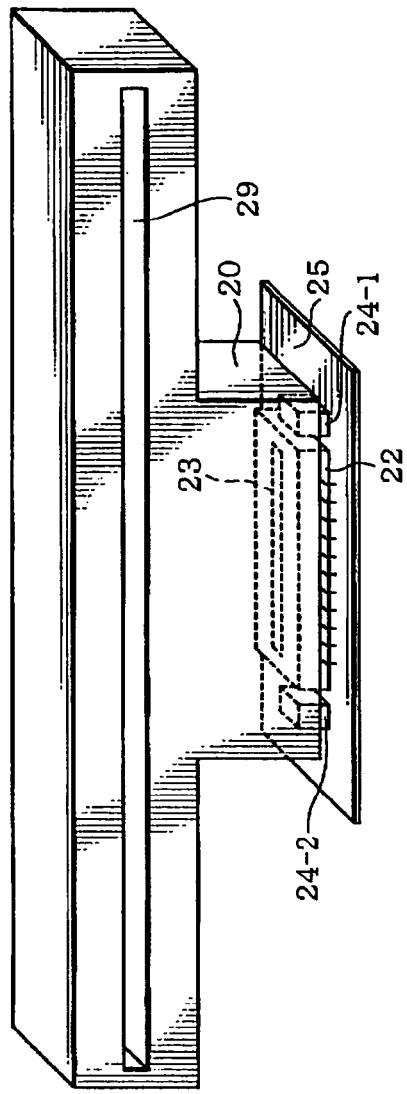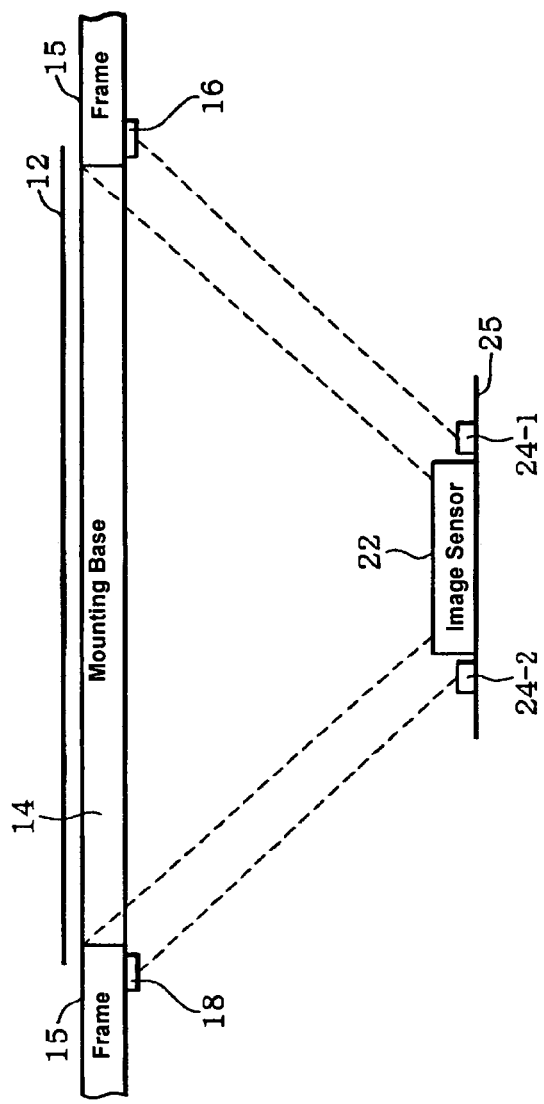
Fig. 9 (A)
Fig. 9 (B)

ELECTRONIC DEVICE

RELATED APPLICATION DATA

This application is related to two applications filed concurrently herewith: (1) entitled "Image Sensor Controller, Electronic Device, and Method for Controller Image Sensor" and identified by Ser. No. 10/715,741; and (2) entitled "Electronic Device Controller, and Method for Controlling Electronic Device" and identified by Ser. No. 10/715,742. Both of these related applications are incorporated by reference herein.

BACKGROUND OF THE INVENTION

1. Field of the Invention

The present invention relates to electronic devices with printed matter containing servo control information located such that it can be sensed and used to perform servo control.

2. Description of the Related Art

Electronic devices such as image scanners, facsimile machines and copy machines use an image sensor, i.e., Charge Coupled Device (CCD), Contact Image Sensor (CIS), or Bucket Brigade Device (BBD), to read images. A carriage on which an image sensor is mounted is driven by a motor that is servo-controlled by a servo controller. A variety of conventional techniques have been employed for the servo control.

However, in the past, a rotary encoder with a linked gear attached to a motor shaft and a photo interrupter that detects rotations of the rotary encoder have been used to control the speed of the carriage. Also, a position sensor to detect an initial position (home position) of the carriage is separately provided to control the initial position of the carriage. The additional parts, including separate sensor and associated parts, increases the complexity of the devices, makes it more time-consuming to assemble at factory, and poses an obstacle to lowering the cost of such electronic devices.

OBJECTS OF THE INVENTION

The present invention has been made in view of the technical problem described above. Accordingly, it is an object of this invention to provide electronic devices in which the number of parts required for servo control is reduced.

SUMMARY OF THE INVENTION

The present invention relates to an electronic device comprising at least one sensor; a carriage on which the sensor(s) is/are mounted; a drive device that drives the carriage in a scanning direction; printed matter containing servo control information located in a detection area of the sensor(s) for servo control of the drive device; and a servo controller that performs servo control of the drive device based on servo control information detected by the sensor.

In accordance with the present invention, servo control information contained in the printed matter is detected (read) by the carriage mounted sensor(s) (image sensor or optical sensor(s)). Then a drive device (motor, carriage) is servo-controlled based on the servo control information detected, and the carriage is driven in a scanning direction (for example in an auxiliary scanning direction). By so performing servo control for driving the carriage, the number of parts required for servo control can be reduced.

The electronic device preferably further comprises a support structure that includes a light-transmitting mounting base and at least a portion of the frame that supports the mounting base. The support structure has a first surface for supporting an object to be read and a second surface opposing surface, wherein the printed matter is disposed on the second surface. Preferably, the second surface is the rear or underside surface on the image sensor(s) side of the support structure.

The mounting base may be rectangular, and the frame portion surrounds the four sides of the mounting base to provide support. The second surface is defined by the front or upper surface of the mounting base and the corresponding surface of the frame portion. Thus, the printed matter can be provided on the frame portion of the second surface, on the mounting base portion of the second surface or in a border region of the second surface such that the printed matter is disposed on both the mounting base and the frame portion.

The printed matter may be rectangular and may be disposed along the scanning direction. For example, when the sensor is a line sensor, the rectangular printed matter can be disposed along the auxiliary scanning direction of the line sensor.

The printed matter preferably includes first printed matter that includes servo control information for controlling speeds of the carriage and second printed matter that includes servo control information for detecting an initial position of the carriage. Of course both speed and initial position control may be performed using only one printed matter.

The first printed matter for speed control may be provided on one side of the support structure along the scanning direction, and the second printed matter for initial position detection may be provided on a second side of the support structure along the scanning direction. In the preferred embodiments, the first and second sides are parallel to one another.

The first printed matter may include a plurality of mutually different print patterns for speed control. The speed control printed matter may be in the form of one or more barcodes. In the latter case, the barcodes have mutually different bar intervals. A first barcode with a relatively wide bar interval for high speed control and a second barcode with a narrower bar interval for low speed control may be used.

The carriage preferably includes a light source that generates irradiating light, wherein the printed matter is preferably provided in an area on the second surface of the support structure irradiated by the light of the light source. The irradiated area may depend on whether the servo-control-information-reading sensor is also an image sensor or is separately provided.

In the case where the servo-control-information-reading sensor is also the image sensor, a light receiving section of the image sensor preferably includes an effective pixel region and a dummy pixel region that may be used to read servo control information of the printed matter. The dummy pixel region may include a first dummy pixel region for reading servo control information in a first print pattern that is disposed in a detection area of the first dummy pixel region, and a second dummy pixel region for reading servo control information in a second print pattern that is disposed in a detection area of the second dummy pixel region. The first and second dummy pixel regions can be located at opposite ends of the light receiving section.

If one or more sensors, separate from an image sensor, are provided for reading servo control information, then all of the sensors are preferably mounted on the carriage. In this case, the separate sensor(s) may preferably be provided adjacent to the image sensor. If two separate sensors are used, they can be disposed in proximity to respective opposite end regions of the image sensor. One such sensor can be used to read first printed matter disposed in that sensor's detection area, while the other sensor can be used to read second printed matter disposed in that other sensor's detection area. In this case, each of the first and second printed matters may include plural printed patterns.

Also, each separate sensor is preferably disposed with its light receiving surface oriented in the same direction as the light receiving surface of the image sensor.

BRIEF DESCRIPTION OF THE DRAWINGS

FIGS. 6 (A)-(C) illustrates positions where certain printed information is disposed.

FIGS. 8 (A) and (B) illustrate a method for reading printed matter using dummy pixel regions.

FIGS. 9 (A) and (B) illustrate a method for reading printed matter using multiple optical sensors.

DESCRIPTION OF THE PREFERRED EMBODIMENTS

The embodiments described below in conjunction with the drawings are not intended as limiting, but rather are presented as exemplary arrangements of the present invention. As will be appreciated by those skilled in the art, not all structure/operation described in the present embodiments is necessarily indispensable in implementing a solution provided by the present invention.

Figure 1:
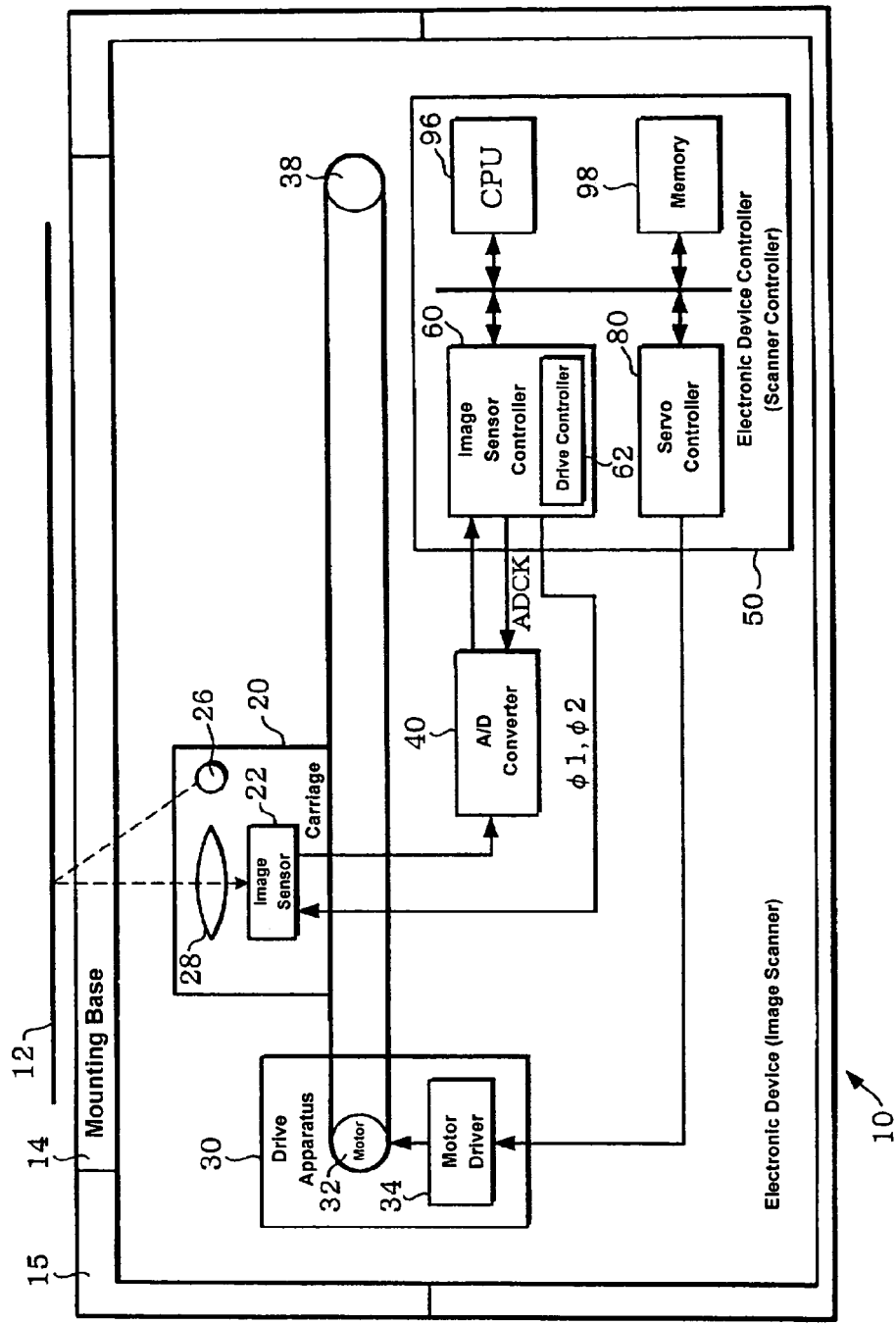
FIG. 1 is a block diagram illustrating an exemplary structure of an electronic device according to embodiments of the invention.

FIG. 1 shows an exemplary structure of an electronic device 10, which may be an image reading device, image scanner, or the like. As noted above, other configurations are possible, including configurations in which one or more of the illustrated components is omitted.

The electronic device 10 (e.g., a flat bed type image scanner) includes a frame 15 (e.g., a support member and housing) on which a generally rectangular mounting base 14 is carried for supporting a source object 12 (e.g., a printed document to be read). The mounting base 14 may be formed from a light-transmitting material—glass, for example. The source object 12 is mounted on an upper surface of the light-transmitting mounting base 14.

The electronic device 10 includes a carriage 20, on which is mounted an image sensor 22 (image pickup device, line sensor, one-dimensional sensor or color sensor). A CCD, CIS, or BBD may be used as the image sensor 22. Also mounted on the carriage 20 is a light source 26 that generates light for irradiating the source object 12, and an optical system or head such as a lens 28 that converges light emitted from the light source 26 and reflected off of the source object 12 on the image sensor 22. A mirror or the like is mounted on the carriage 20 to deflect the light from the light source 26 or the reflected light from the source object 12 in order to lengthen or bend the optical path. A light sensor for detecting servo control information may be provided independently of the image sensor 22 and mounted on the carriage 20. Also, an A/D converter 40 and an electronic device controller 50 may be mounted on the carriage 20 or mounted separately.

The electronic device 10 includes a drive device 30 that drives and shifts the carriage 20. The drive device 30 includes a motor 32, and a motor driver 34 that drives the motor 32. Motor 32 may be, for example, a DC motor of the brush or brushless variety.

In response to being driven by the motor 32, the carriage 20 moves in an auxiliary scanning direction, i.e., generally perpendicular to a main scanning direction. The image sensor 22 is disposed with its longitudinal direction being coincident with the main scanning direction. A driving belt 36, which is mounted on a pulley 38, is rotated by the motor 32, such that the carriage 20 affixed on the driving belt 36 moves in the auxiliary scanning direction. It will be appreciated that this is but one of a variety of methods by which the carriage 20 may be moved. Other arrangements are possible in accordance with modified embodiments. For example, the carriage 20 may be moved without using the driving belt 36 which may be accomplished, for example, using a linear motor mechanism.

Analog image data (an analog image signal) that is generated by the image sensor 22 is input into the A/D converter 40 which converts such data into digital image data (a digital image signal) and outputs the same to an electronic device controller 50 (e.g., a scanner controller).

The electronic device controller 50 is configured to control image read processing or the like performed by the electronic device 10. More specifically, controller 50 performs servo control for moving the carriage 20, or control for driving the image sensor 22 mounted on the carriage 20. The electronic device controller 50 includes an image sensor controller 60 that controls the image sensor 22, generating control signals and driving patterns and outputting the same to the image sensor 22. Also, the image sensor controller 60 receives digital image data from the A/D converter 40, and performs a variety of image processing operations, such as gamma conversion, shading processing, and binary conversion processing.

The image sensor controller 60 includes a drive controller 62 that generates transfer clocks $\phi 1$, $\phi 2$ (drive patterns, drive signals) and supplies them to the image sensor 22. The drive controller 62 supplies the image sensor 22 with transfer clocks $\phi 1$, $\phi 2$ having different clock frequencies according to regions of pixels (dummy pixels, non-reading pixels, reading pixels) of the image sensor 22. In other words, it supplies the transfer clocks $\phi 1$, $\phi 2$ such that clock frequencies, which are indicative of the rates of transferring image data, differ according to output periods of image data from the image sensor 22. More specifically, the drive controller 62 selects, from among a plurality of clock patterns, a clock pattern according to an output period of the image sensor 22 and supplies the transfer clocks $\phi 1$, $\phi 2$ based on the selected clock pattern.

The clock patterns are clock waveforms patterns having different clock frequencies, rise and fall clock pulse timings, and/or duties of clocks, which are stored in a memory or the like. The drive controller 62 selects from among the clock patterns stored in the memory an appropriate clock pattern and repeats the selected clock pattern at predetermined cycles (for example, in cycles of pixel processing units) to thereby generate transfer clocks φ1, φ2.

Alternatively, transfer clocks φ1, φ2 having a constant frequency may be supplied without regard to output periods.

The electronic device controller 50 includes a servo controller 80 that performs servo control (feedback control) on the motor 32 that drives the carriage 20. More specifically, servo controller 80 controls movement of the carriage 20 to desired positions (such as an initial position) or at desired speeds based on servo control information obtained in association with movements of the carriage 20 (i.e., information regarding the detected positions and speeds of the carriage 20).

The electronic device controller 50 includes a CPU 96 (processor) and a memory 98 (ROM, RAM). The CPU 96 performs overall controls of the electronic device controller 50, and exchanges information with the outside. Also, the memory 98 stores programs and various data, and functions as a work region for the image sensor controller 60, the servo controller 80 and the CPU 96.

As previously noted, the electronic device controller 50 does not necessarily include all the components shown in FIG. 1; it may have a structure in which a part thereof is omitted. For example, the CPU 96 and the memory 98 may be omitted. Also, the functions of the electronic device controller 50, the image sensor controller 60 and the servo controller 80 may be realized by hardware circuits, or may be realized by both software and hardware circuits (e.g., one or more Application Specific Integrated Circuit (ASICs), or a general purpose processor.

Figure 2:
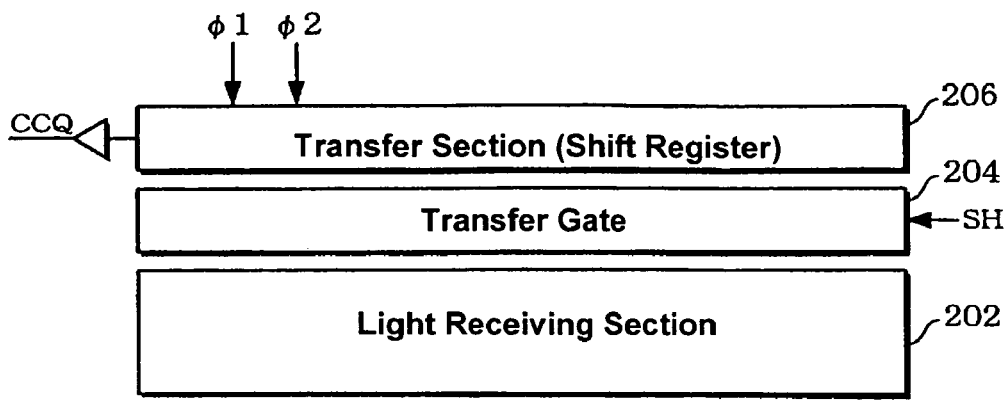
FIGS. 2 (A)-(C) are diagrams illustrating an exemplary structure and operations of an image sensor according to embodiments of the invention.
Figure 2:
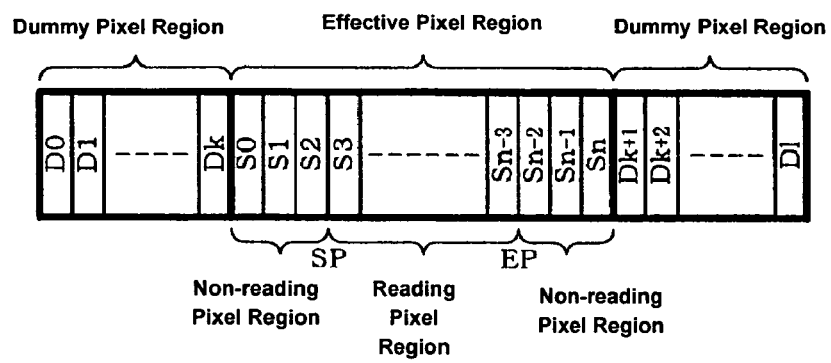
Figure 2:
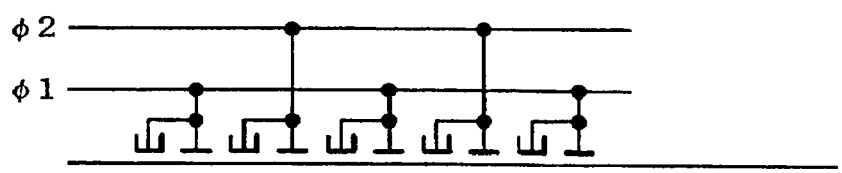

FIG. 2 (A) shows an exemplary composition of the image sensor 22 (CCD line sensor). A light receiving section 202 includes a plurality of light receiving elements (photodiodes, pixels) that perform photoelectric conversion. As shown in FIG. 2 (B), the light receiving section 202 is provided with an effective pixel region where effective pixels (light receiving elements) $S_0$-$S_n$ are disposed in a row, and dummy pixel regions where dummy pixels $D_0$-$D_k$ and $D_{k+1}$-$D_1$, which are not effective pixels, are disposed in a row. These dummy pixels are provided for no-load feeding or light-shield outputs.

Figure 3:
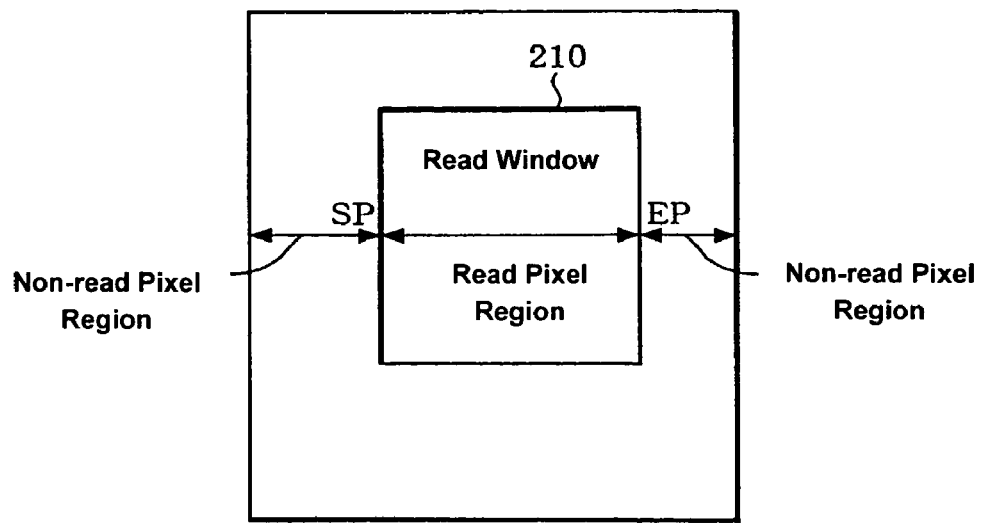
FIGS. 3 (A) and (B) are diagrams illustrating an exemplary structure and operations of an image sensor according to embodiments of the invention.
Figure 3:
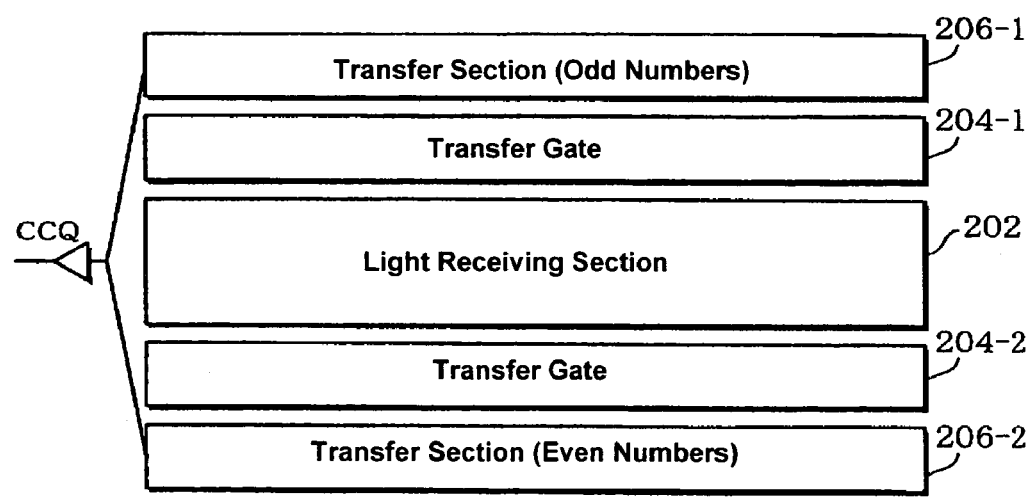

Also in the image scanner, a read window 210 for designating a reading range, such as the one indicated in FIG. 3 (A), may be set by the user through an application program, such that image data only within this read window 210 is read. In this case, as shown in FIG. 3 (A), a reading pixel region is defined as a region between a read starting position SP and a read ending position EP. Other regions (e.g., the one before SP and the one after EP) define non-reading pixel regions. Referring to FIG. 2 (B), in an effective pixel region, the pixels $S_3$-$S_{n-3}$ between SP and EP define the reading pixel region, and the pixels $S_0$-$S_2$ and $S_{n-2}$-$S_n$ define respective non-reading pixel regions. It is noted that the positions of SP and EP that set the reading pixel region are not limited to those positions shown in FIG. 2 (B). SP and EP may be set differently to provide a different reading pixel region. The reading and non-reading pixel regions may be collectively defined as the effective pixel region.

Each of the light receiving elements (e.g., pixels) of the light receiving section 202 generates and stores a charge according to the amount of light received. After a predetermined time period required for charge accumulation has passed, a shift signal SH becomes active, such that a transfer gate 204 turns on. In response, accumulated charge, which represents the analog image data, is transferred through the transfer gate 204 to a transfer section 206 which comprises a plurality of shift registers, one for each of the light receiving elements. Then, the image data (in the form of accumulated charge) is transferred between adjacent shift registers based on two phases of transfer clocks φ1, φ2, and serially outputted from a CCQ terminal of the image sensor 22. The frequency of the shift/transfer clocks may be variably controlled or may be set constant.

FIG. 2 (C) shows an exemplary structure of a shift register of the transfer section 206 in connection with the transfer/shift clocks φ1, φ2.

The structure of the image sensor 22 is not limited to the one shown in FIG. 2 (A). In another embodiment, shown in FIG. 3 (B), a transfer gate 204-1 and a transfer section 206-1 for odd numbered pixels, and a transfer gate 204-2 and a transfer section 206-2 for even numbered pixels are provided. Also, in connection with either of the embodiments of the image sensor 22 (FIGS. 2 (A) and 3 (B)), a light receiving section, a transfer gate and a transfer section, for reading image data in each of R (red), G (green) and B (blue), are preferably provided.

Figure 4:
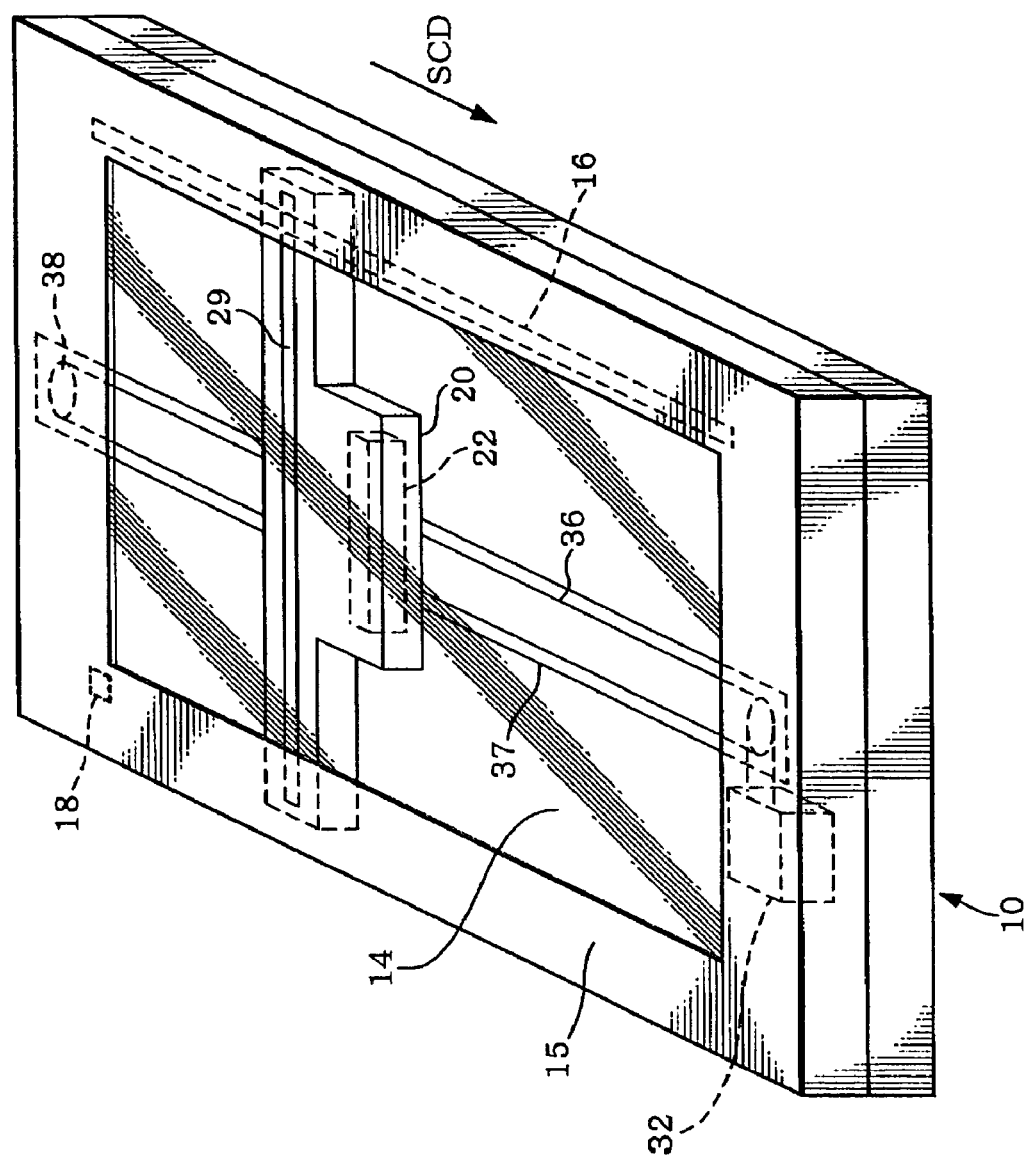
FIG. 4 is perspective view of an electronic device showing its various components according to embodiments of the invention.

Referring to FIG. 4, a schematic, perspective view of electronic device 10 in accordance with embodiments of the invention is illustrated. In the present embodiment, printed matter 16 and 18 for servo control are attached to, printed on, or otherwise disposed on, the electronic device 10. The printed matter 16, 18 may be composed of barcodes or the like and located on a rear or underside surface of either the mounting base 14 or the surrounding portion of the supporting frame 15. By way of reference, the front or upper surface of the mounting base 14 is where an object to be read is placed.

In one embodiment, the image sensor 22 mounted on the carriage 20 reads servo control information (printed information for controlling the speed and position of the carriage 20 or the like) contained in the printed matter 16 and 18, as well as text/images of the source object placed on the mounting base 14. More specifically, a detection area corresponding to an opening section 29 of the carriage 20 (which is an area above the opening section 29 that has generally the same shape as opening section 29) is irradiated by the light from the light source 26 (see FIG. 1) mounted on the carriage 20. Reflected light of the irradiated light (light reflected on the source object and printed matter) is converged by the lens 28 of the optical system (see FIG. 1), and the converged light is detected by the image sensor 22 to thereby read the servo control information in the printed matter 16 and 18 and the text/images on the reading object.

Then, based on the read servo control information, the servo controller 80 in FIG. 1 performs servo control on the motor 32 to thereby control the speed and position of the carriage 20. More specifically, the drive belt 36 is rotated by the motor 32, such that the carriage 20 is moved along a guide 37 in the auxiliary scanning direction. In so doing, the speed and position of the carriage 20 are controlled based on the servo control information provided in the printed matter 16 and 18, while the images/text on the source object are read.

In conventional electronic devices such as image scanners, facsimiles and copiers, a rotary encoder, a photo interrupter, and a separate position sensor to detect an initial position (home position) are provided to control movement of the carriage 20. This is disadvantageous in that such a construction requires more parts and more time to assemble the parts at factory.

In contrast, in accordance with embodiments of the invention, printed matter 16 and 18 containing servo control information are disposed on the electronic device 10, and the image sensor 22 that reads the text and images on the source object can also be used to read the servo control information. In fact, the entire optical system for the image sensor 22 (including the light source 26, lens 28 and the like in FIG. 1) can be used as an optical system that also reads the servo control information in the printed matter 16 and 18. Thus, with the present invention, the number of parts can be reduced, the work for mounting parts can be reduced, and the cost of electronic devices can be lowered.

Figure 5:
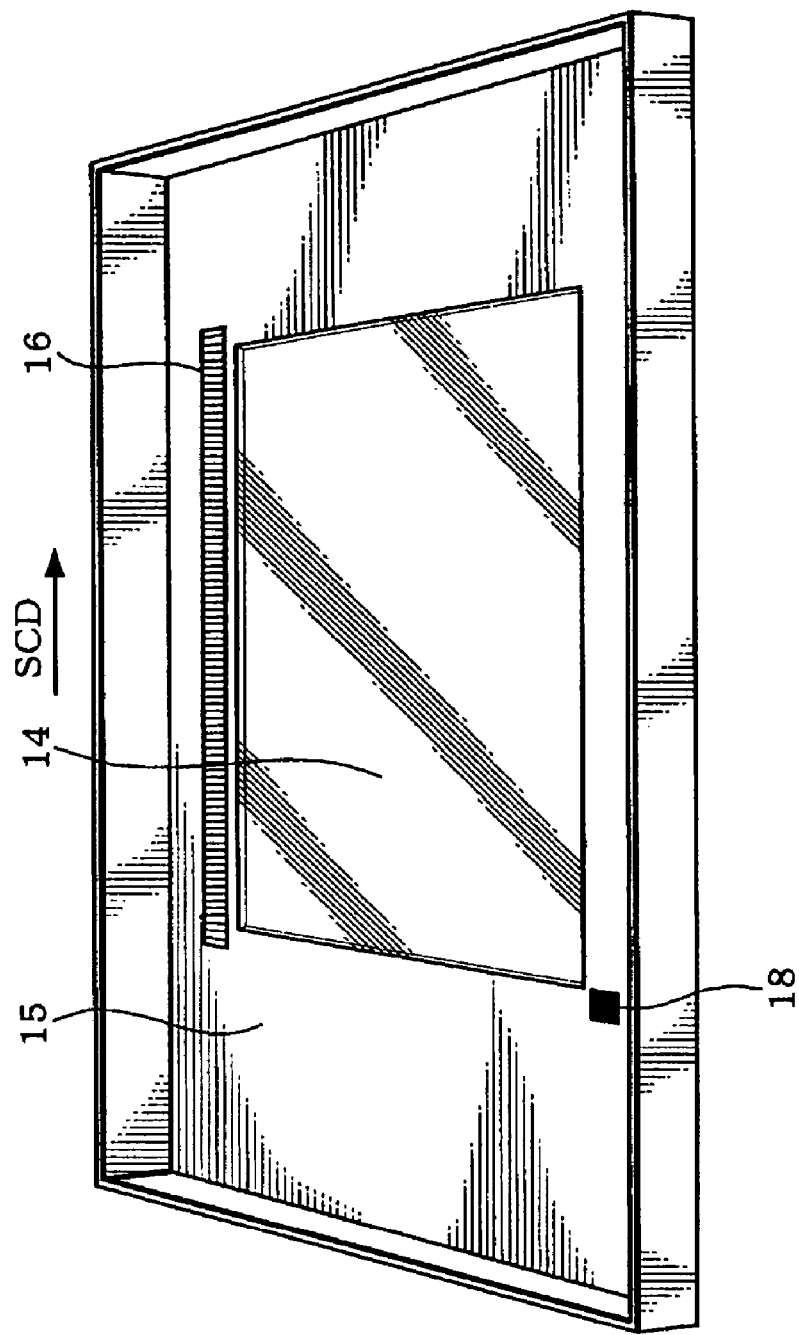
FIG. 5 illustrates positions where source objects (e.g., printed materials) are disposed.

Printed matter 16 and 18 are provided in detection areas (which are areas that can be detected by the image sensor; areas irradiated by the light source 26 in FIG. 1.; or areas that oppose to the opening section 29 in FIG. 4) to be detected by the image sensor 22 that is mounted on the carriage 20. Note that FIG. 5 is a perspective view of the frame. 15 (removed from the electronic device 10) as seen from the image sensor side. Thus, as indicated in FIG. 5, the printed matter 16 and 18 are disposed on an opposing surface (with respect to the surface on which the object to be read is mounted) of the frame 15 or corresponding surface of the mounting base 14.

Servo control information, which includes information for controlling the speed, position of the carriage 20 and the like, is contained in printed matter 16 and 18. More specifically, servo control information for controlling the speed of the carriage 20 may be contained in the printed matter 16. As the printed matter 16 for speed control, a barcode composed of bars of a predetermined color such as black or white arranged at predetermined intervals (intervals according to speeds) can be used. Also, the printed matter 16 is preferably rectangular and is disposed along the auxiliary scanning direction (e.g., SCD direction shown in FIGS. 4 and 5). Servo control information for detecting an initial position of the carriage 20 may be contained in the printed matter 18. As the printed matter 18 for initial position detection, printed matter that is painted in a predetermined color such as black or white (which can be considered as one type of barcode) can be used. Also, the printed matter 18 is preferably located in a location corresponding to the initial position (home position) of the carriage 20.

As indicated in FIG. 6 (A), the printed matter 16 for speed control may be provided on a first side ED1 (one side along the auxiliary scanning direction SCD) of the frame 15. The printed matter 18 for initial position detection may be provided on a second side ED2 (the other side along the auxiliary scanning direction SCD) of the frame 15. It is noted that FIGS. 6 (A) and (B) and FIGS. 7 (A)-(C) show the mounting base and surrounding portion of the frame 15 looking at its rear or underside surface (the opposite surface from where the object to be read is mounted).

By disposing the servo-control-containing printed matter 16 and 18 in this manner, the servo speed control information in the printed matter 16 can be read using a first dummy pixel region ($D_{k+1}$-$D_1$ in FIG. 2 (B)) on the right side of the image sensor 22, and the servo control information for initial position detection in the printed matter 18 can be read using a second dummy pixel region ($D_0$-$D_k$ in FIG. 2 (B)) on the left side of the image sensor 22. Accordingly, the servo control information for speed control and for initial position detection can be obtained by different dummy pixel regions, such that the processing by the servo controller 80 can be simplified.

As indicated in FIG. 6 (B), the printed matter 16 and 18 may be disposed on the same side (ED1 or ED2).

As indicated in FIG. 6 (C), a plurality of printed matters for speed control in different print patterns may be provided. This may be in the form of three print patterns: a print pattern 16-1 for low speed (first speed), a print pattern 16-2 for medium speed (second speed), and a print pattern 16-3 for high speed (third speed). In this case, print patterns 16-1, 16-2 and 16-3 (e.g., barcodes) have mutually different bar intervals (intervals between black or white bars). More specifically, print pattern 16-1 for low speed has the narrowest bar interval, print pattern 16-2 for medium speed has the second narrowest bar interval, and print pattern 16-3 for high speed has the greatest bar interval.

By providing servo control information in this way, the servo controller 80 can perform servo control according to the corresponding speed control ranges. For example, when the carriage 20 is at a low speed (first speed), the servo control is performed based on the servo control information in print pattern 16-1; when the carriage 20 is at a medium speed (second speed), the servo control is performed based on the servo control information in print pattern 16-2; and when the carriage 20 is at a high speed (third speed), the servo control is performed based on the servo control information in print pattern 16-3.

Alternatively, servo control information from two of the print patterns 16-1, 16-2 and 16-3 may be used to perform the servo control. For example, when the carriage is at a high speed, both the print pattern 16-3 for high speed and the print pattern 16-2 for medium speed may be used to perform the servo control.

Figure 7:
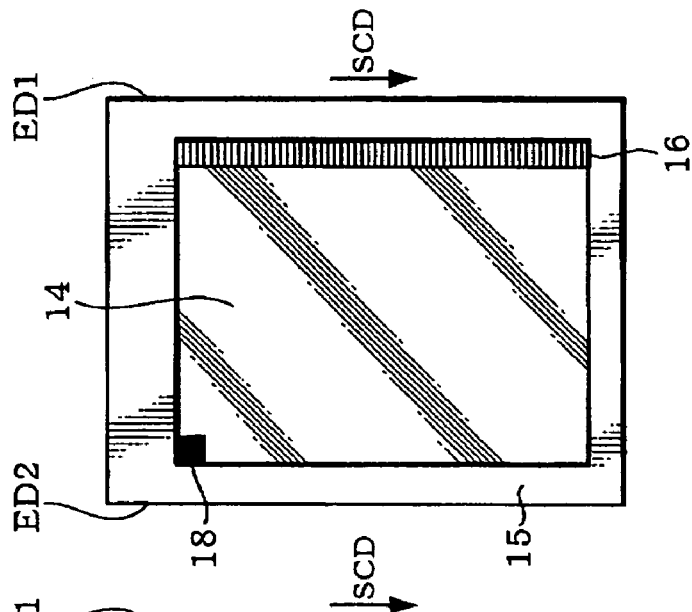
FIGS. 7 (A)-(C) are further illustrations depicting where certain printed information is disposed.
Figure 7:
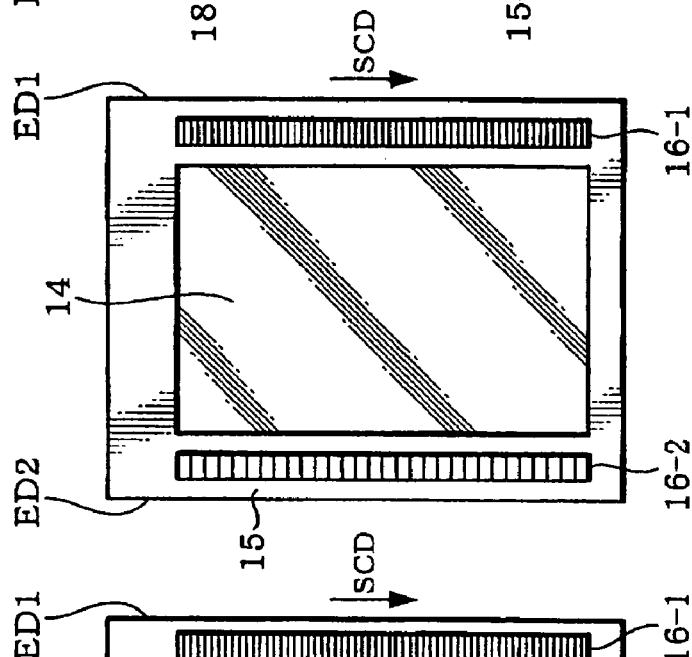
Figure 7:
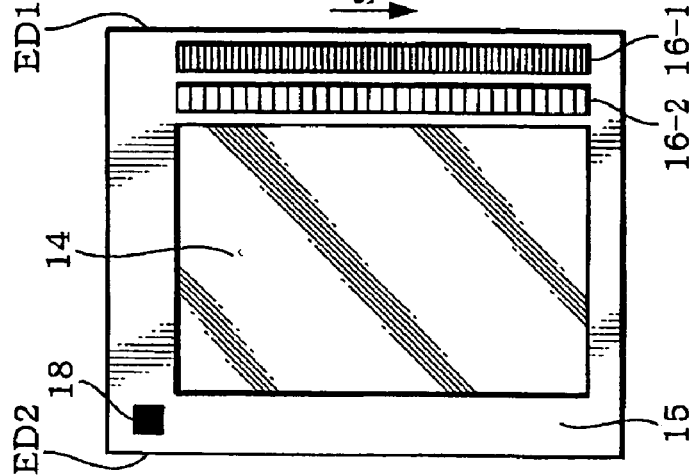

Also, the number of separate printed matter provided for speed control may be 3, as indicated in FIG. 6 (C), or may be 2, or 4 or more. The locations of the various speed control print matter may be varied as well. For example, as indicated in FIG. 7 (A), print patterns 16-1 and 16-2 may be disposed on the ED1 side, and printed matter 18 for initial position detection may be provided on the ED2 side. The locations may be reversed of course. Also, three or more different speed control print patterns may be disposed on the same side (ED1 or ED2).

As indicated in FIG. 7 (B), the print pattern 16-1 (e.g., the printed matter for a first speed) may be provided on the ED1 side, and the print pattern 16-2 (e.g., the printed matter for a second speed) may be provided on the ED2 side. Other arrangements are also possible as will be appreciated. For example, two or more different print patterns may be provided on either the ED1 or the ED2 side.

As indicated in FIG. 7 (C), the print patterns 16-1-16-3 and printed matter 18 may be disposed on the rear surface of the mounting base 14 instead of the frame 15. More specifically, the printed matter 16 and 18 may be attached to opposite sides of the rectangular mounting base 14 along ED1 and ED2 sides respectively. This narrows the reading area for an object to be read and therefore may not be feasible in all cases. However, detection by the image sensor 22 (sensor) can be facilitated.

While a variety of positional arrangements for disposing servo-control-containing printed matter 16, 18 on the rear or underside surface of the structure that includes the mounting base 14 and the surrounding portion of the frame 15 have been illustrated, other positional arrangements are possible, as will be appreciated by those skilled in the art. Such printed matter can be disposed in other areas (on the above-described rear surface or elsewhere) that are detectable by the sensor(s) designated to read the servo control information contained therein.

The printed matter 16 (16-1-16-3) and 18 may be in the form of stickers that may be adhered to the rear side of the frame 15 or the mounting base 14. Alternatively, the printed matter may be directly printed on the frame 15 or the mounting base 14 by an ink jet method or the like. Or, members (for example, metal members) printed with appropriate control patterns may be attached to the frame 15 or the mounting base 14.

Servo control information in the various printed matter 16, 18 can be read using a dummy pixel region (contain one or preferably a plurality of pixels) of the image sensor. For example, FIG. 8 (A) schematically shows a perspective view of the carriage 20, which is removed from the electronic device 10 and viewed from the side where there is an opening section 29 in the carriage 20. The image sensor 22 is mounted on a substrate (e.g., a circuit substrate) 25. The electronic device controller 50 shown in FIG. 1 may also be mounted on the substrate 25.

The image sensor 22 is provided with an opening section 23 (a window provided in the IC of the image sensor 22). Reflected light from the read object 12 and the printed matter enters the opening section 29, its light path is deflected by an optical system (lens, mirror or prism) of the carriage 20, and the reflected light is converged and projected into the opening section 23 of the image sensor 22. The image sensor 22 detects the reflected light that enters through the opening section 23 to read images/text from the read object and servo control information on the printed matter.

As indicated in FIG. 8 (B), the servo control information in printed matter 16, 18 can be read using the dummy pixel regions (dummy pixel regions without light shields) of the image sensor 22. In one embodiment, the servo control information on the printed matter 16 is read by a dummy pixel region ($D_{k+1}$-$D_1$ in FIG. 2 (B)) on one side (e.g., the right side) of the light receiving section 202 of the image sensor 22, while the servo control information in printed matter 18 is read by a dummy pixel region ($D_0$-$D_k$ in FIG. 2 (B) on the other side (e.g., the left side) of the image sensor 22. In this case, the printed matter 16, 18 are provided in detection areas (areas irradiated by light from the light source 26 in FIG. 1) of the image sensor 22, such that the servo control information can be securely read. As a result, the dummy pixel regions, which are not necessary for reading effective image data, can be effectively used to read servo control information.

One or more dummy pixels (light receiving element(s)) in a dummy pixel region may be used to read servo control information on a particular printed matter. When a plurality of dummy pixels are so used they are preferably arranged in the main scanning direction, and a majority processing, an average processing or similar operation is performed to determine the read servo control information.

In the embodiment of FIGS. 8 (A) and (B), the servo control information in printed matter 16, 18 are read by dummy pixel regions on each side of the image sensor 22. However, such information can be read by only one of these dummy pixel regions. Also, some of the pixels in the effective pixel region of the image sensor 22 can be used to read servo control information in the printed matter 16, 18.

Also, when printed matter are provided for speed and position control as described with respect to FIGS. 6 (A) through 7 (C), a portion of the dummy pixel region may be designated as a servo control pixel region. Then, the clock frequencies of $\phi 1$, $\phi 2$ may be variably controlled during a servo control information output period during which image data read by the servo control pixel region is outputted from the transfer section. In that case, the clock frequencies of $\phi 1$, $\phi 2$ during a servo control information output period are made slower than the clock frequencies of $\phi 1$, $\phi 2$ during dummy pixel output periods in which no servo control information is output. Even more specifically, the clock frequencies of $\phi 1$, $\phi 2$ during a servo control information output period are made slower than the clock frequencies of $\phi 1$, $\phi 2$ during other dummy pixel output periods but faster than the clock frequencies of $\phi 1$, $\phi 2$ during a reading pixel output period. As a result, servo control information can be appropriately read using a designated section of pixels in the dummy pixel region.

In another embodiment, illustrated in FIGS. 9 (A) and (B), optical sensors 24-1 and 24-2, which are provided independently of the image sensor 22, are used to detect servo control information on printed matter. The optical sensors 24-1, 24-2 are mounted on the carriage 20 together with the image sensor 22, and the optical sensors 24-1 and 24-2 read the servo control information on the printed matter 16 and 18.

For example, reflected light from the to-be-read object and the printed matter enters opening section 29 shown in FIG. 9 (A), its light path is deflected by an optical system of the carriage 20, and the reflected light is converged and enters opening section 23 of the image sensor 22 and the optical sensors 24-1, 24-2. The optical sensors 24-1, 24-2 read servo control information on the printed matter by detecting the reflected light entered.

As indicated in FIG. 9 (B), the servo control information on the printed matter 16, 18 can be read using the optical sensors 24-1, 24-2 disposed on respective sides of the image sensor 22. In the illustrated arrangement, the optical sensor 24-1 is provided on the right side of the image sensor 22, and that optical sensor detects one type of servo control information (e.g., speed control information) on printed matter 16. The optical sensor 24-2 is provided on the left side of the image sensor 22, and that optical sensor detects the other type of servo control information (e.g., initial position detection information) on printed matter 18. In this way, the servo control information on the printed matter 16, 18 can be securely read. It is noted that the detection areas of the optical sensors 24-1, 24-2 are located on a rear or underside surface of the frame/mounting base structure which is also the side on which the optical sensors 24-1, 24-2 are located. The detection areas extend from an outer periphery region of the mounting base 14 across the boundary to an inner periphery region of the frame 15.

When the optical sensors 24-1, 24-2 are provided independently of the image sensor 22 as indicate in FIGS. 9 (A) and (B), the number of parts of the sensors may increase compared with the embodiment shown in FIGS. 8 (A) and (B). However, even with separately provided servo-control-information-reading sensors, the other optical system (e.g., the light source 26, lens 28, mirror or prism, etc.) for the image sensor 22 can also be used for the optical sensors 24-1, 24-2. Further, a rotary encoder and a photo interrupter, which are necessary for conventional electronic devices, are unnecessary in the embodiment of FIGS. 9 (A) and (B). Also, by mounting the optical sensors 24-1, 24-2 on the carriage 20 together with the image sensor 22, a more compact arrangement can be realized, as compared with an arrangement in which sensors are dispersed in many places in the electronic device. Accordingly, with both the embodiment of FIGS. 8 (A) and (B) and the embodiment of FIGS. (A) and (B), as compared with corresponding conventional electronic devices, the number of parts can be reduced, the work for assembling these parts can be reduced, and the cost of such devices can be reduced.

As will be appreciated by those skilled in the art, alternate arrangements to that shown in FIGS. 9 (A) and (B) are certainly possible. For example, the optical sensors may both be provided on the same side of image sensor 22. Also, three or more optical sensors may be provided.

Figure 10:
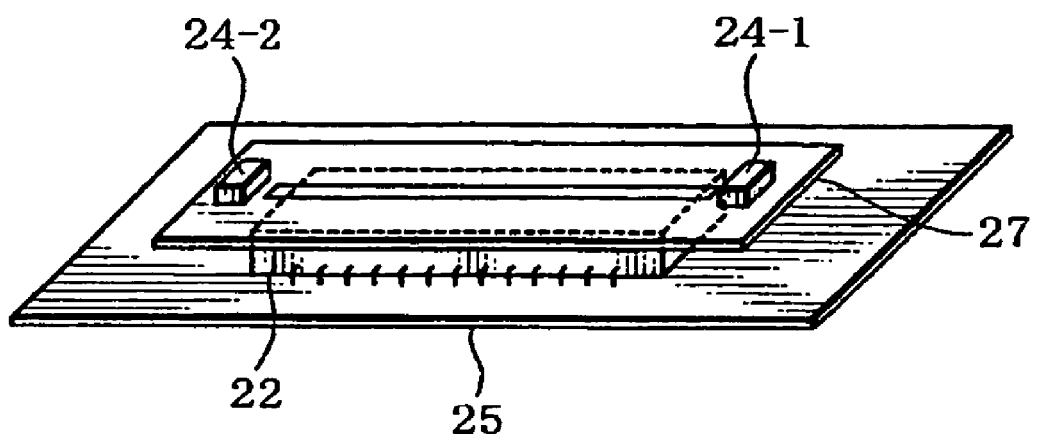
FIG. 10 illustrates a method for reading printed matter using the optical sensors.

Further, although FIG. 9 (B) shows that the optical sensors 24-1, 24-2 are attached to the substrate 25, such sensors may be attached to a substrate 27 that is used for light shielding or the like, as indicated in FIG. 10. The substrate 27 provided in parallel with the substrate 25 is affixed to an upper part of the image sensor 22, and includes an opening section for passing light.

Also, each of the optical sensors 24-1, 24-2 may have one or more light receiving elements.

Figure 11:
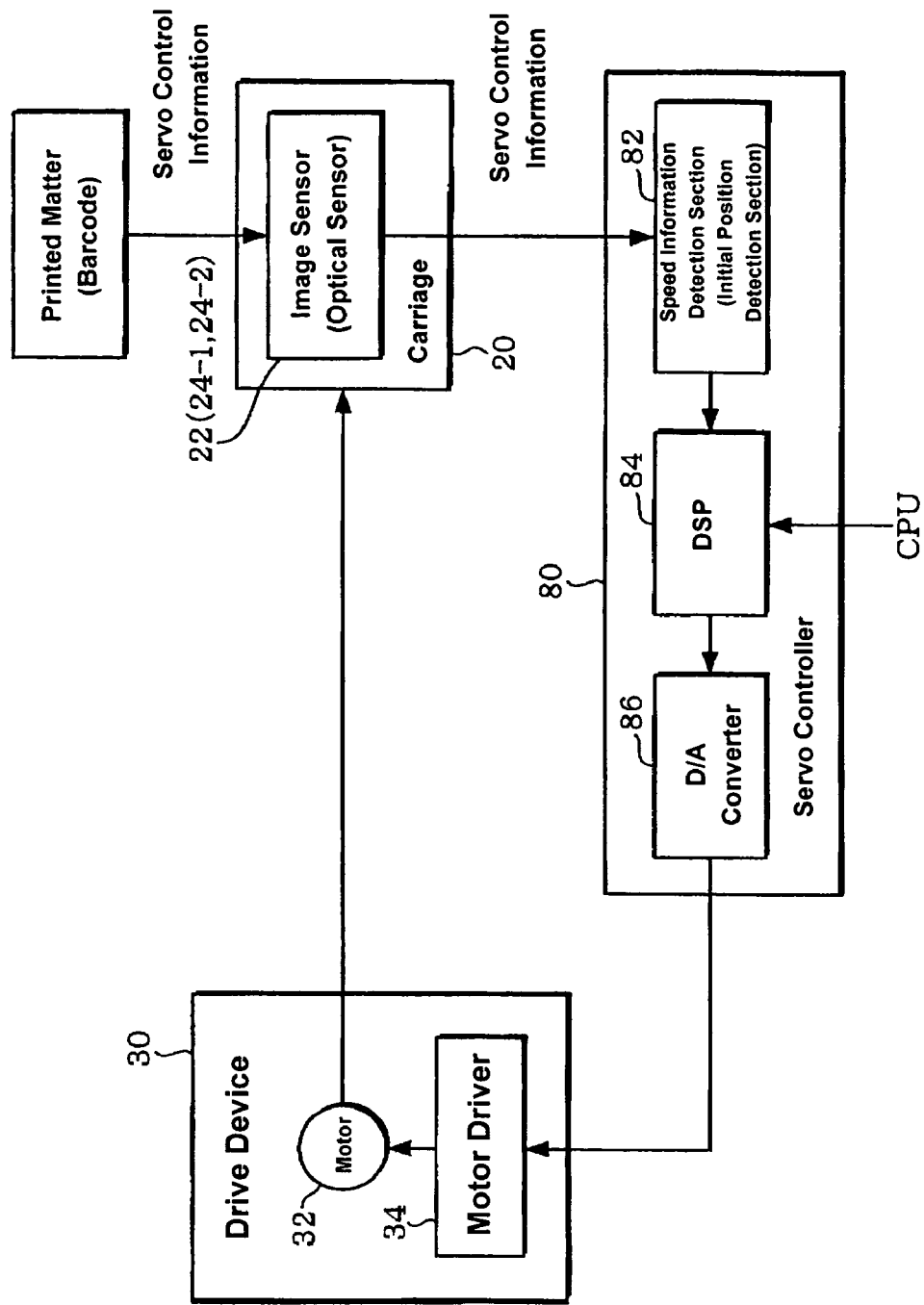
FIG. 11 is a block diagram illustrating an exemplary structure of a servo controller.

FIG. 11 shows an exemplary structure of the servo controller 80. It is noted that the servo controller 80 is not limited to the structure shown in FIG. 11; one or more of the components thereof may be omitted or other components may be added. In the illustrated embodiment, the servo controller 80 includes a speed information/initial position detection section 82. The speed information detection section 82 detects servo control speed information about the carriage 20 read by the image sensor 22 (or the optical sensors 24-1, 24-2). More specifically, a processing such, as binary-conversion of the servo control information provided from the image sensor 22 may be performed to thereby detect speed information. Detection section 82 may also function as an initial position information detection section.

The function(s) of the speed information/initial position detection section 82 may be realized using a Digital Signal Processor (DSP) 84 in a succeeding stage that performs a variety of processing operations for servo control based on the speed/initial position information on the carriage 20, which is detected by the detection section 82. In other words, feedback control of the speed of the carriage 20 (motor 32) is performed to match the speed of the carriage 20 at a particular time with one of the target speeds set in a speed table (speed profile) that may be written by the CPU. More specifically, when the movement of the carriage 20 is started, acceleration control for the carriage 20 is performed such that the speed of the carriage 20 is controlled to match a target speed set for an acceleration period in the speed table. Next, speed control for the carriage 20 is performed according to a target speed set for a constant speed period in the speed table to move the carriage 20 at that constant speed. Then, when the carriage 20 approaches a target position, a deceleration control for the carriage 20 is performed such that the speed of the carriage 20 is decelerated to a target speed set for a deceleration period in the speed table. In this manner, the carriage 20 can be moved to, and stopped at, a desired position.

When the carriage 20 reaches a read starting position, the servo controller 80 asserts or activates a read permission signal to be outputted to the image sensor controller 60. As the carriage 20 moves by an amount equivalent to the number of read lines, the read permission signal is deactivated.

The DSP 84 may also perform a control to return the carriage 20 to the initial (home) position based on the initial position information detected by the initial position detection section 82. More specifically, when the carriage 20 has moved, and a predetermined color (e.g., black) of the printed matter 18 is detected by the image sensor 22 (or optical sensor 24-2), the carriage 20 is stopped. Taking into account the inertia of the carriage 20, the printed matter 18 may preferably be disposed at a location before the initial (home) position where the carriage 20 is actually stopped.

A D/A converter 86 converts digital drive signals from the DSP 84 to analog drive signals, and outputs the same to the motor driver 34. Then, the motor driver 34 drives the motor 32 to thereby perform speed control and position control of the carriage 20.

Figure 12:
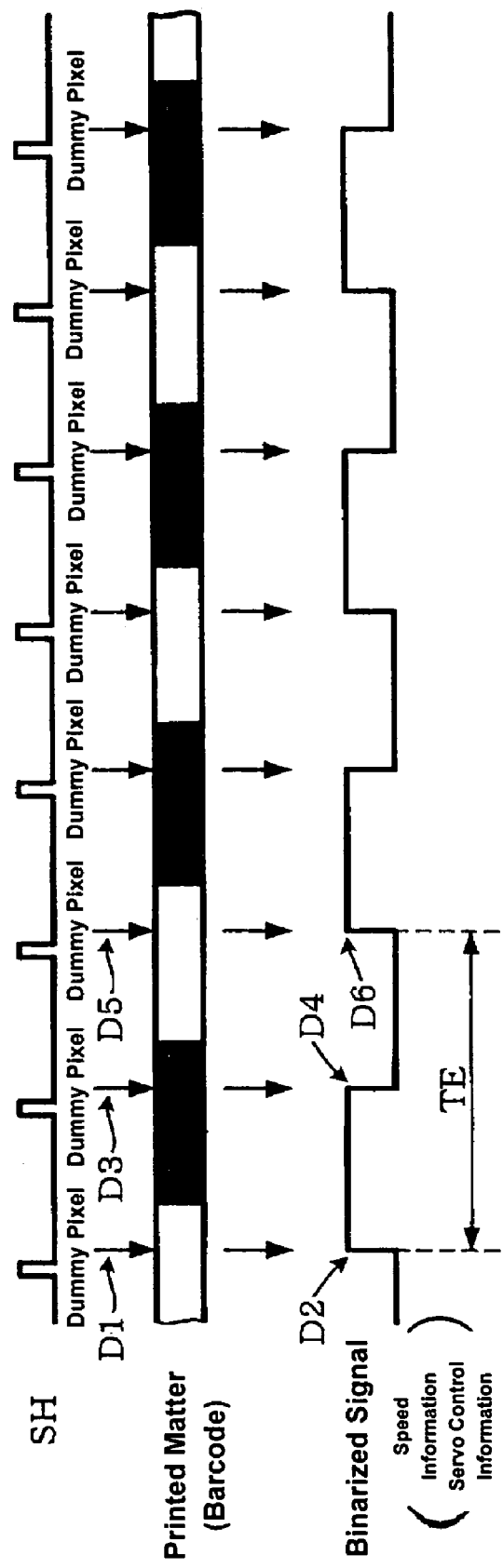
FIG. 12 is a diagram including timing waveforms illustrating an operation of reading printed matter.

FIG. 12 shows an example of timing waveforms for operations of the servo controller 80. For example, at D1 of FIG. 12, the color of the printed matter (bar code) is detected as white, based on image data read by dummy pixels (e.g., dummy pixels $D_0$-$D_k$ in FIG. 2 (B)) immediately after the shift signal SH becomes active. More specifically, the data from the image sensor. 22 is binarized, such that a binarized signal representing speed information, for example, becomes high (active) as indicated by D2. Then, at D3 the color of the printed matter is detected as black, based on data read by the dummy pixels, and the binarized signal becomes low (non-active) as indicated by D4. Also, at D5 the color of the printed matter is detected as white based on data read by the dummy pixels, and the binarized signal becomes high as indicated by D6. By obtaining the time interval TE between edges (rising edges or falling edges) of the binarized signal, the speed information for the carriage 20 can be detected.

Figure 13:
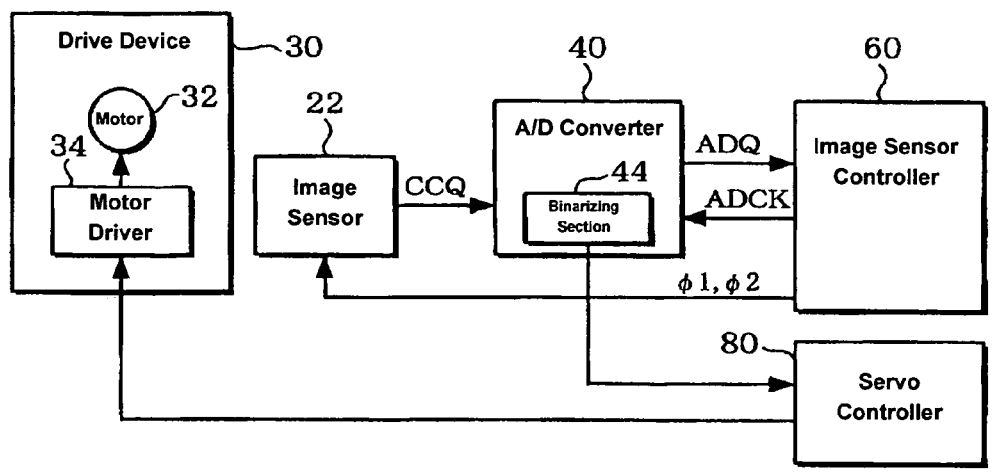
FIGS. 13 (A)-(C) are diagrams illustrating binarization processing.
Figure 13:
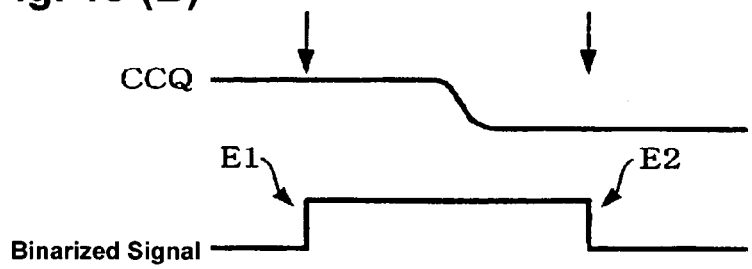
Figure 13:
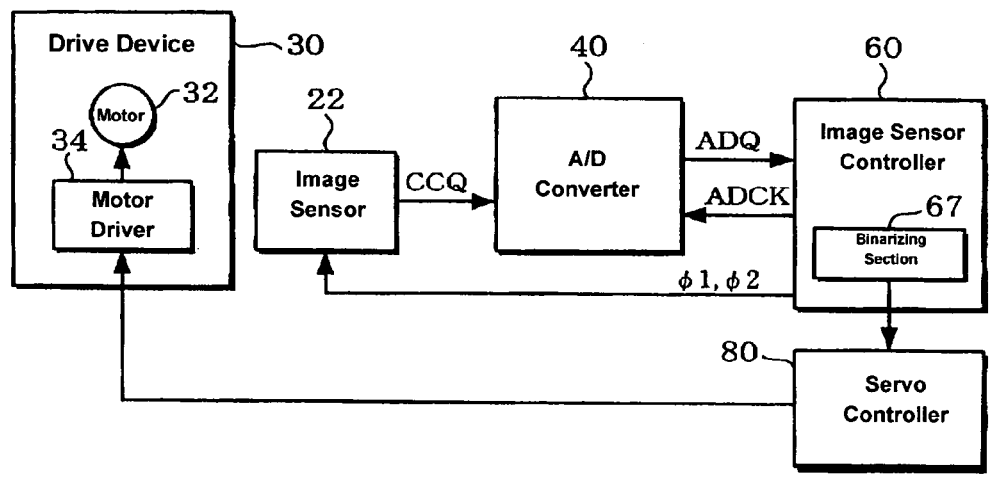

An output CCQ (analog image data) of the image sensor 22 is binarized by a binarizing section 44, which can be included in the A/D converter 40 as shown in FIG. 13 (A), to generate the binarized signal indicated in FIG. 12. For example, as indicated in FIG. 13 (B) at E1 (D2 in FIG. 12), when the voltage level of CCQ is higher than a predetermined threshold value (in the case of white), the binarized signal is determined to be "1," and as indicated in FIG. 13 (B) at E2 (D4 in FIG. 12), and when the CCQ voltage is lower than the predetermined threshold value (in the case of black), it is determined to be "0." In this manner, the binarized signal is generated. Then, the generated binarized signal is output to the servo controller 80 (speed information detection section).

The binarizing section 67 may alternatively be included in the image sensor controller 60, as indicated in FIG. 13 (C). In that arrangement, digital image data ADQ from the A/D converter 40 is binarized by the binarizing section 67 through digital signal processing. In this case, the binarizing section 67 may detect speed information and initial position information based on binarized data.

Figure 14:
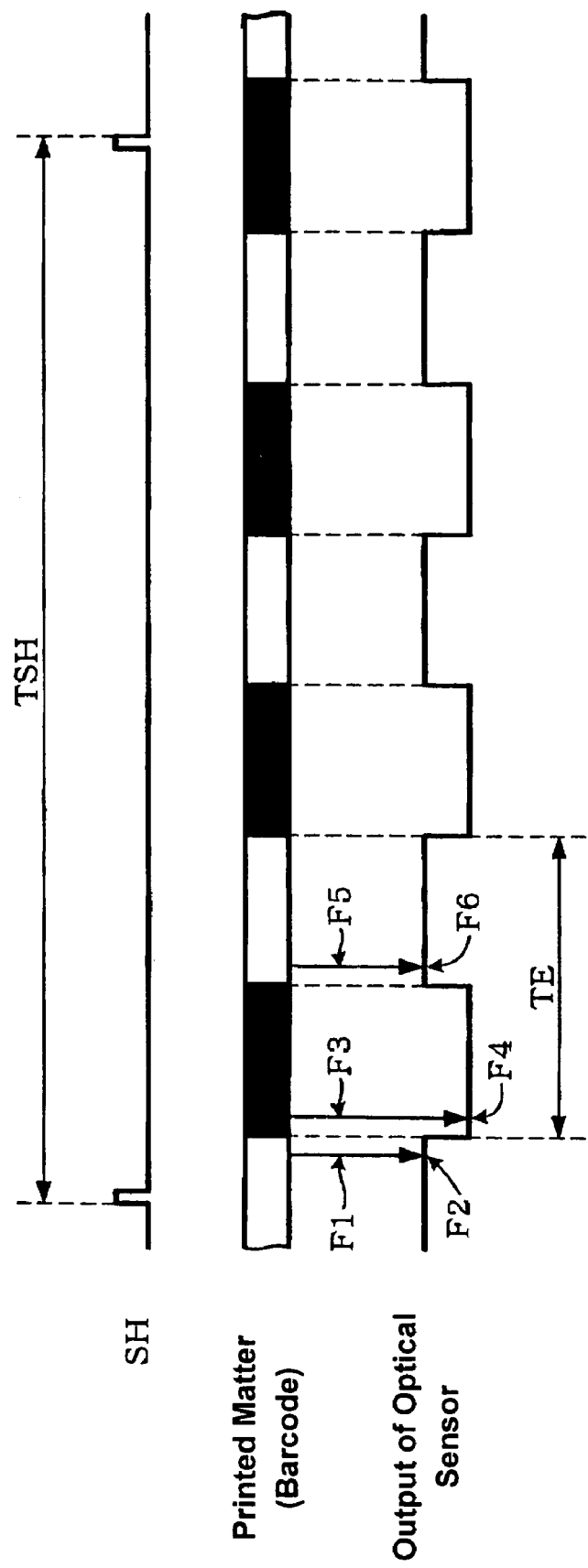
FIG. 14 is a diagram including timing and output waveforms illustrating an operation of reading printed matter.

FIG. 14 shows an example of timing waveforms applicable to the reading of servo control information on printed matter by the optical sensors 24-1 and 24-2 that are provided independently of the image sensor 22 as indicated in FIGS. 9 (A) and (B). For example, at F1 of FIG. 14, the color of the printed matter (barcode) is detected as white by the optical sensor (24-1, 24-2). As a result, the output of the optical sensor becomes high (active) as indicated by F2. At F3, the color of the printed matter is detected as black by the optical sensor. As a result, the output of the optical sensor becomes low (non-active) as indicated by F4. At F5, the color of the printed matter is detected as white by the optical sensor. As a result, the output of the optical sensor becomes high as indicated by F6. By obtaining the time interval TE between edges (rising edges or falling edges) of the output (binarized signal) from the optical sensor, the speed information for the carriage 20 can be detected. By using the detected speed information (initial position information), a servo control like the one described with reference to FIG. 11 can be realized.

In the example shown in FIG. 14, the amount of servo control information obtained in the time interval TSH between pulses of the shift signal SH is greater compared with the example shown in FIG. 12. In other words, the number of edges (rising or falling edges) of the output (binarized signal) of the optical sensor during the time interval TSH is increased. Accordingly, it gives an advantage that a higher precision in controlling movements of the carriage 20 can be achieved. It is noted that, even when printed matter is read using an image sensor as in the case of FIG. 12, an image sensor (CCD) with a high sensitivity may be used to achieve a higher precision in controlling movement of the carriage 20.

While the present invention has been described in conjunction with several specific embodiments, further alternatives, modifications, variations and applications will be apparent to those skilled in the art in light of the foregoing description.

For example, the structure and composition of the electronic device, electronic device controller, image sensor controller, servo controller, image sensor, and the like are not limited to those disclosed herein. For example, as a drive mechanism for the carriage, a mechanism that is different from the one described in the present embodiment can be used. The same is true with respect to the methods for controlling the image sensor controller and servo controller disclosed herein. An image sensor of a type that does not include a transfer section can be used. Also, in addition to being applicable to image scanners, facsimiles and copiers, the present invention is also applicable to other electronic devices and hybrid devices of the aforementioned devices. Accordingly, the invention herein is intended to embrace all such alternatives, modifications, variations and applications, as may fall within the spirit and scope of the appended claims.

What is claimed is:

1. An electronic device, comprising:
   at least one sensor,
   a carriage on which the at least one sensor is mounted;
   a drive device configured to drive the carriage in a scanning direction;
   a support structure that includes a light-transmitting mounting base and at least a portion of a frame that supports the mounting base;
   the support structure supporting an object to be read;
   printed matter containing servo control information located in a detection area on the support structure of the at least one sensor for servo control of the drive device; and
   a servo controller configured to perform servo control on the drive device based on servo control information detected by the sensor.

2. An electronic device according to claim 1, wherein:
   the support structure further comprises a first surface for supporting an object to be read and a second opposing surface; and
   the printed matter is provided on the second surface.

3. An electronic device according to claim 2, wherein the printed matter is rectangular in shape and disposed such that its longer dimension extends along the scanning direction.

4. An electronic device according to claim 2, wherein the printed matter includes first printed matter that includes servo control information for controlling speeds of the carriage and second printed matter that includes servo control information for detecting an initial position of the carriage.

5. An electronic device according to claim 4, wherein the first printed matter for speed control is provided on a first side of the support structure along the scanning direction and the second printed matter for initial position detection is provided on a second side of the support structure along the scanning direction.

6. An electronic device according to claim 4, wherein the first printed matter includes a plurality of mutually different print patterns for speed control.

7. An electronic device according to claim 4, wherein the first printed matter comprises at least one barcode.

8. An electronic device according to claim 7, wherein the first printed matter comprises a plurality of barcodes with mutually different bar intervals.

9. An electronic device according to claim 7, wherein the first printed matter includes a first barcode with a relatively wide bar interval for high speed control and a second barcode with a narrower bar interval for low speed control.

10. An electronic device according to claim 2, wherein the carriage includes a light source that generates irradiating light and the printed matter is provided in an area on the second surface of the support structure irradiated by the light of the light source.

11. An electronic device according to claim 2, wherein the at least one sensor comprises an image sensor that is adapted to read information on an object to be read and that has a light receiving section including an effective pixel region and a dummy pixel region that is used to read the servo control information of the printed matter.

12. An electronic device according to claim 11, wherein
   the dummy pixel region includes a first dummy pixel region in first end region of the light receiving section and a second dummy pixel region in a second end region of the light receiving section, and
   the printed matter includes a plurality of mutually different print patterns including a first print pattern that is provided in a detection area of the first dummy pixel region, and a second print pattern that is provided in a detection area of the second dummy pixel region.

13. An electronic device according to claim 2, further comprising an image sensor configured to read information on an object to be read, the image sensor being mounted on the carriage together with the at least one sensor.

14. An electronic device according to claim 13, wherein
   the at least one sensor includes a first sensor disposed in proximity to a first end region of the image sensor and a second sensor disposed in proximity to a second end region of the image sensor, and
   the printed matter includes first printed matter disposed in a detection area of the first sensor and second printed matter disposed in a detection area of the second sensor.

* * * * *